(12) United States Patent
Mezza et al.

(10) Patent No.: US 8,912,351 B2
(45) Date of Patent: Dec. 16, 2014

(54) PROCESS FOR REMOVING METALS FROM TALLOW OIL

(75) Inventors: Beckay J. Mezza, Arlington Heights, IL (US); Alakananda Bhattacharyya, Glen Ellyn, IL (US); F. Stephen Lupton, Evanston, IL (US)

(73) Assignee: UOP LLC, Des Plaines, IL (US)

( * ) Notice: Subject to any disclaimer, the term of this patent is extended or adjusted under 35 U.S.C. 154(b) by 326 days.

(21) Appl. No.: 13/413,185

(22) Filed: Mar. 6, 2012

(65) Prior Publication Data

US 2013/0158279 A1 Jun. 20, 2013

Related U.S. Application Data

(60) Provisional application No. 61/570,953, filed on Dec. 15, 2011.

(51) Int. Cl.
*C11B 3/00* (2006.01)

(52) U.S. Cl.
USPC .......................................................... 554/176

(58) Field of Classification Search
USPC .......................................................... 554/176
See application file for complete search history.

(56) References Cited

U.S. PATENT DOCUMENTS

| | | |
|---|---|---|
| 2,413,099 A | 12/1946 | Taussky |
| 2,654,766 A | 10/1953 | Taussky |
| 2004/0202771 A1 | 10/2004 | Lee |
| 2009/0057232 A1 | 3/2009 | Angeles-Boza et al. |
| 2009/0119979 A1 | 5/2009 | Mullen |
| 2009/0234146 A1 | 9/2009 | Cooney et al. |
| 2011/0155645 A1* | 6/2011 | Serban et al. ................. 208/187 |

FOREIGN PATENT DOCUMENTS

| | | |
|---|---|---|
| WO | 2009017425 A1 | 2/2009 |
| WO | 2009030894 A1 | 3/2009 |

OTHER PUBLICATIONS

Marcinkowski, "Alkaline stabilisation of primary sludge part 1. Analyses of lipids", Environment Protection Engineering, vol. 30, No. 3, pp. 35-41, 2004.

Song, "Effective Phase Separation of Biomass Pyrolysis Oils by Adding Aqueous Salt Solutions", Energy & Fuels 2009, 23, 3307-3312.

Zhang, "Microwave-assisted conversion of lignocellulosic biomass into furans in ionic liquid", Bioresource Technology 101 (2010) 1111-1114.

* cited by examiner

*Primary Examiner* — Deborah D Carr

(74) *Attorney, Agent, or Firm* — Mark Goldberg

(57) ABSTRACT

A process for removing a metal from a tallow feed includes contacting the tallow feed comprising the metal with a tallow oil-immiscible ionic liquid to produce a tallow oil and TALLOW-immiscible ionic liquid mixture, and separating the mixture to produce a tallow oil effluent having a reduced metal content relative to the tallow feed. The metals removed include iron, aluminum, calcium, magnesium, sodium, zinc, and potassium.

17 Claims, 2 Drawing Sheets

PROCESS FOR REMOVING METALS FROM TALLOW OIL

CROSS-REFERENCE TO RELATED APPLICATION

This application claims priority from Provisional Application No. 61/570,953 filed Dec. 15, 2011, the contents of which are hereby incorporated by reference.

BACKGROUND OF THE INVENTION

The present invention relates to processes for removing one or more metals from tallow oils. More particularly, the invention relates to such processes using an ionic liquid.

Tallow oil is a rendered form of fat, mainly from beef or mutton, although industrially, tallow oil may include fat from other animals such as pigs. Tallow manufacture consists of freeing fat from its associated tissues by heat rendering and then refining it to separate it from the solids and water which would lead to its deterioration. Tallow oil (also known as "tallow") is used in animal feed, to make soap, shoe polish, for cooking and as a bird food. It can be used as a raw material for the production of biodiesel and other chemicals. Tallow also has a history of use as a lubricant for machinery as well as for ammunition. In addition to fat, tallow typically contains parts per million levels of a variety of minerals or metals. In one particular study, the level of such minerals was found to range from about 10-20 ppm sodium, 2-3 ppm potassium, 1-2 ppm calcium, 0.4-0.5 ppm iron, 1.1-1.2 ppm lead, 0.4 to 0.5 ppm magnesium, 0.070 ppm cadmium, 0.025 to 0.055 ppm zinc, 0.8 to 1.0 ppm chromium. Ali, Pakistan JOURNAL OF NUTRITION 7 (5) 717-720, 2008. Analysis of 3A Darling animal fat, a type of tallow is shown in the table below.

| Tallow | 3A Darling Animal Fat |
|---|---|
| API | 23.23 |
| Specific Gravity, 60° F. | 0.9145 |
| Hydrogen, wt-% | 12.01 |
| Carbon Residue, wt-% | 0.62 |
| Al, wt-ppm | 2.4 |
| Ca, wt-ppm | 3.63 |
| Fe, wt-ppm | 5.5 |
| Na, wt-ppm | 300 |
| P, wt-ppm | 32 |
| K, wt-ppm | 14.6 |
| Nitrogen, wt-ppm | 1736 |
| Sulfur, wt-ppm | 421 |
| Water, wt-ppm | 2210 |

Processes have been recently developed which take vegetable oils, or lipids, and convert them into replacements for diesel and jet fuels, recent filings include the following references: US2009283442, US2009301930, US2009287029, US2009253947, US2009250376, US2009294324, US2009162264, and US2009158637.

The resultant fuels from this refining process are indistinguishable from existing fossil based petro-diesels and jet fuels. In addition to vegetable oils, tallow is one source of fat that is suitable for converting into a diesel or jet fuel. Tallow contains metal contaminants and in particular, contains ppm levels of iron which acts as a catalyst poison. It is thought that the iron contaminant is in the form of the heme molecule from traces of blood in the tallow. The heme molecule contains iron that is at the center of a nitrogen ring structure within a hydrocarbon molecule. This invention uses specific ionic liquids to extract iron from tallow.

The prior art includes Liquid/Liquid Extraction of Metal Ions in Room Temperature Ionic Liquids, by Visser, Ann E., et al, SEPARATION SCIENCE AND TECHNOLOGY, 36(5&6), 785-804, (2001), Marcel Dekker, Inc., discloses the use of room temperature ionic liquids, specifically, 1-alkyl-3-methylimidazolium hexafluorophosphate, to separate metal ions from aqueous solutions. However, there remains a need in the art for improved processes that reduce the metal content of tallow.

SUMMARY OF THE INVENTION

In an embodiment, the invention is a process for removing a metal from a tallow oil comprising: contacting the tallow oil comprising the metal with a tallow-immiscible ionic liquid comprising at least one of a imidazolium ionic liquid, a phosphonium ionic liquid, and a pyridinium ionic liquid to produce a mixture comprising the tallow and the tallow-immiscible ionic liquid; and separating the mixture to produce a tallow effluent and a tallow-immiscible ionic liquid effluent comprising the metal. The addition of water may be necessary to enhance the tallow immiscibility of the ionic liquid.

In another embodiment, the tallow-immiscible phosphonium ionic liquid comprises at least one ionic liquid from at least one of the following groups of ionic liquids: 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, tetrabutylphosphonium methane sulfonate, pyridinium p-toluene sulfonate, tetrabutylphosphonium chloride, tetrabutylphosphonium bromide, tributyl(octyl)phosphonium chloride, and tributyl(ethyl)phosphonium diethylphosphate, tetraalkylphosphonium dialkylphosphates, tetraalkylphosphonium dialkyl phosphinates, tetraalkylphosphonium phosphates, tetraalkylphosphonium tosylates, tetraalkylphosphonium sulfates, tetraalkylphosphonium sulfonates, tetraalkylphosphonium carbonates, tetraalkylphosphonium metalates, oxometalates, tetraalkylphosphonium mixed metalates, tetraalkylphosphonium polyoxometalates, and tetraalkylphosphonium halides. In another embodiment, the tallow-immiscible phosphonium ionic liquid comprises at least one of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl)phosphonium methylsulfate, tributyl(ethyl)phosphonium diethylphosphate, and tetrabutylphosphonium methanesulfonate. In a further embodiment, the tallow-immiscible phosphonium ionic liquid is selected from the group consisting of trihexyl(tetradecyl)phosphonium chloride, trihexyl(tetradecyl)phosphonium bromide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(methyl)phosphonium methylsulfate, tributyl(ethyl)phosphonium diethylphosphate, tetrabutylphosphonium methanesulfonate, and combinations thereof. The VGO-immiscible phosphonium ionic liquid may be selected from the group consisting of trihexyl(tetradecyl)phosphonium halides, tetraalkylphosphonium dialkylphosphates, tetraalkylphosphonium tosylates, tetraalkylphosphonium sulfonates, tetraalkylphosphonium halides, and combinations thereof. The VGO-immiscible phosphonium ionic liquid may comprise at least one ionic liquid from at least one of the following groups of ionic liquids trihexyl(tetradecyl)phosphonium halides, tetraalkylphosphonium dialkylphosphates, tetraalkylphosphonium tosylates, tetraalkylphosphonium sulfonates, and tetraalkylphosphonium halides.

In a further embodiment, the mixture comprises water in an amount less than 95% relative to the amount of tallow-immiscible ionic liquid in the mixture on a weight basis; the mixture may be water free.

DETAILED DESCRIPTION OF THE INVENTION

Figure 1:
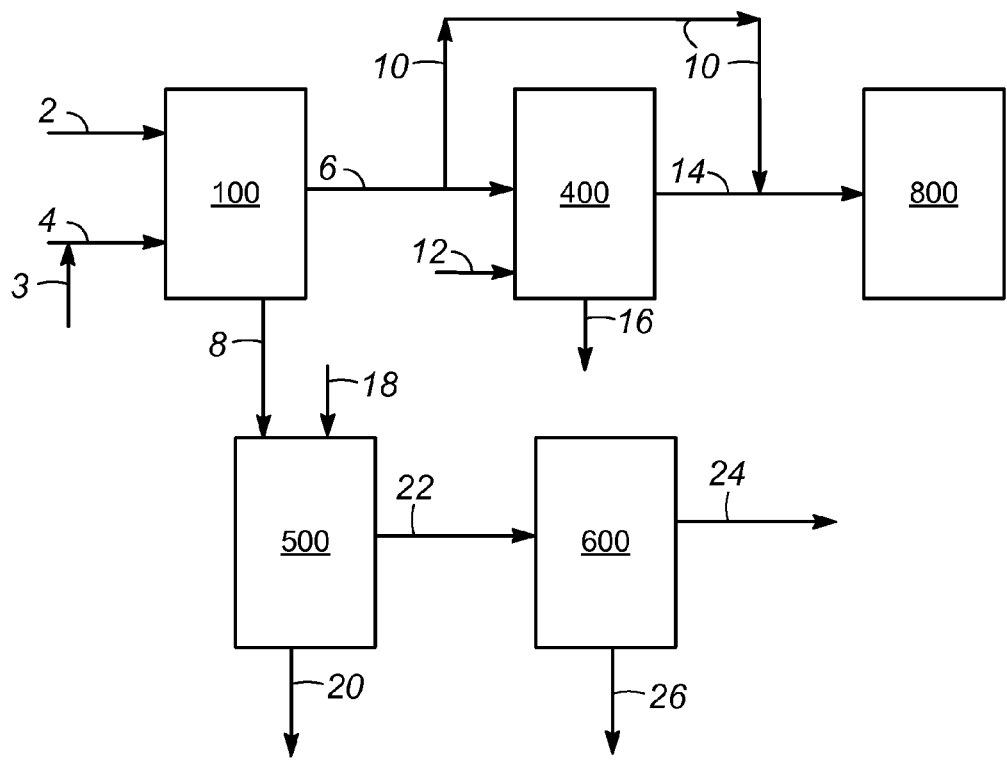
FIG. 1 is a simplified flow scheme illustrating various embodiments of the invention.

In general, the invention may be used to remove one or more metals from a tallow oil (tallow) hydrocarbon fraction through use of a tallow-immiscible ionic liquid.

The terms "tallow oil", "tallow", and similar terms such as yellow grease, brown grease, suet and lard relating to tallow oil as used herein are to be interpreted broadly to receive not only their ordinary meanings as used by those skilled in the art of, but also in a broad manner to account for the application of our processes to compositions from other animal fats exhibiting tallow-like characteristics. Thus, the terms encompass tallow oil that is a rendered form of beef or mutton fat, and animal-derived fats from other domesticated animals including chickens and pigs. The term tallow oil also includes fats from other animals. The typical composition of the fatty acids in tallow usually includes saturated fatty acids such as palmitic acid 20-30%, stearic acid 10-20%, and myristic acid 2-5%; monounsaturated fatty acids such as oleic acid 40-50%, and palmitoleic acid 3-5%; and polyunsaturated fatty acids such as linoleic acid 3-5%, and linolenic acid 1% in levels similar to these values. Chicken fat has been reported as containing about 10% palmitoleic acid and 25% linoleic acid.

Generally, tallow oil may contain a varying amount of iron as well as total metals. The level of metals will vary depending upon the source of the feed, the water as well as the local soils. The iron level may vary depending upon the quantity of residual blood that is in the animal remains that is processed into the tallow. The metals content may be determined by UOP389-09, Trace Metals in Oils by Wet Ashing and ICP-OES. Unless otherwise noted, the analytical methods used herein such as UOP389-09 are available from ASTM International, 100 Barr Harbor Drive, West Conshohocken, Pa., USA. The iron found in tallow oil includes iron contained in heme proteins such as myoglobin, hemoglobin and cytochromes and nonheme compounds such as ferritin (an intracellular iron-storage protein) and hemosiderin (an insoluble form of tissue storage iron found within cells). A number of different metals may be present in a tallow oil feed. In the present invention, ionic liquids were found to be effective in removal of iron, aluminum, calcium, magnesium, sodium, zinc and potassium. Processes according to the invention reduce the metal content of tallow oil and in particular, iron containing compounds. The tallow oil may comprise a plurality of metals in various amounts. Thus, the invention removes at least a portion of at least one metal from the tallow oil.

In an embodiment, a metal content of the tallow oil is reduced by at least about 10% on an elemental basis. The invention may remove at least about 25% of a metal from the tallow oil on an elemental basis; and the invention may remove at least about 50% of a metal from the tallow oil on an elemental basis. In a preferred embodiment, the invention may remove at least about 90% of the iron in the tallow oil and up to close to 100% of the iron.

One or more ionic liquids may be used to extract one or more metals from tallow oil. Generally, ionic liquids are non-aqueous, organic salts composed of ions where the positive ion is charge balanced with negative ion. These materials have low melting points, often below 100° C., undetectable vapor pressure and good chemical and thermal stability. The cationic charge of the salt is localized over hetero atoms, such as nitrogen, phosphorous, sulfur, arsenic, boron, antimony, and aluminum, and the anions may be any inorganic, organic, or organometallic species.

Ionic liquids suitable for use in the instant invention are tallow-immiscible ionic liquids or the ionic liquid can become tallow immiscible by dilution with water. As used herein the term "tallow-immiscible ionic liquid" means the ionic liquid is capable of forming a separate phase from tallow oil under operating conditions of the process. The operating conditions may include the addition of water. Ionic liquids that are miscible with tallow oil at the process conditions will be completely soluble with the tallow oil; therefore, no phase separation would be feasible. Thus, tallow-immiscible ionic liquids may be insoluble with or partially soluble with tallow oil under operating conditions. An ionic liquid capable of forming a separate phase from the vacuum gas oil under the operating conditions is considered to be tallow-immiscible. Ionic liquids according to the invention may be insoluble, partially soluble, or completely soluble (miscible) with water.

In an embodiment, the tallow-immiscible ionic liquid comprises at least one of an imidazolium ionic liquid, a pyridinium ionic liquid, and a phosphonium ionic liquid. In another embodiment, the tallow-immiscible ionic liquid is selected from the group consisting of imidazolium ionic liquids, pyridinium ionic liquids, phosphonium ionic liquids, and combinations thereof. Imidazolium and pyridinium ionic liquids have a cation comprising at least one nitrogen atom. Phosphonium ionic liquids have a cation comprising at least one phosphorus atom. In an embodiment, the tallow-immiscible ionic liquid comprises at least one of 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, tetrabutylphosphonium methane sulfonate, pyridinium p-toluene sulfonate, tetrabutylphosphonium chloride, tetrabutylphosphonium bromide, tributyl(octyl)phosphonium chloride, triisobutylmethylphosphonium tosylate and tributyl(ethyl)phosphonium diethylphosphate. The tallow-immiscible ionic liquid may be selected from the group consisting of 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, tetrabutylphosphonium methane sulfonate, pyridinium p-toluene sulfonate, tetrabutylphosphonium chloride, tetrabutylphosphonium bromide, tributyl(octyl)phosphonium chloride, tributyl(ethyl)phosphonium diethylphosphate, and combinations thereof.

In an embodiment, the invention is a process for removing a metal from tallow oil comprising a contacting step and a separating step. In the contacting step, tallow comprising the metal and a tallow-immiscible ionic liquid which would include a tallow-immiscible ionic liquid that can be made immiscible by dilution with water are contacted or mixed. The contacting may facilitate transfer or extraction of the one or more metals and/or metal compounds from the tallow oil to the ionic liquid. Although a tallow-immiscible ionic liquid that is partially soluble in tallow oil may facilitate transfer of the metal and/or metal compound from the tallow oil to the ionic liquid, partial solubility is not required. Insoluble tallow/ionic liquid mixtures may have sufficient interfacial surface area between the tallow oil and ionic liquid to be useful. In the separation step, the mixture of tallow oil and ionic liquid settles or forms two phases, a tallow oil phase and ionic liquid phases, which are separated to produce a tallow-immiscible ionic liquid effluent and a tallow oil effluent.

It has been found that undiluted ionic liquids are only partially effective in removing iron from tallow oil. However, when the ionic liquids were diluted with water, the effectiveness in removal of iron was greatly increased. For example, a 50% dilution of the ionic liquids resulted in more than 90% of the iron removed from the tallow oil.

The process may be conducted in various equipment well known in the art that are suitable for batch or continuous operation. For example, in a small scale form of the invention, tallow oil and a tallow-immiscible ionic liquid may be mixed in a beaker, flask, or other vessel, e.g. by stirring, shaking, use of a mixer, or a magnetic stirrer. The mixing or agitation is stopped and the mixture forms a tallow oil phase and an ionic liquid phase which can be separated, for example, by decanting, centrifugation, or use of a pipette to produce a tallow effluent having a lower metal content relative to the tallow oil. The process also produces a tallow-immiscible ionic liquid effluent comprising the metal.

The contacting and separating steps may be repeated for example when the metal content of the tallow oil effluent is to be reduced further to obtain a desired metal level in the ultimate tallow oil product stream from the process. Each set, group, or pair of contacting and separating steps may be referred to as a metal removal step. Thus, the invention encompasses single and multiple metal removal steps. A metal removal zone may be used to perform a metal removal step. As used herein, the term "zone" can refer to one or more equipment items and/or one or more sub-zones. Equipment items may include, for example, one or more vessels, heaters, separators, exchangers, conduits, pumps, compressors, and controllers. Additionally, an equipment item can further include one or more zones or sub-zones. The metal removal process or step may be conducted in a similar manner and with similar equipment as is used to conduct other liquid-liquid wash and extraction operations. Suitable equipment includes, for example, columns with: trays, packing, rotating discs or plates, and static mixers. Pulse columns and mixing/settling tanks may also be used.

FIG. 1 is a flow scheme illustrating various embodiments of the invention and some of the optional and/or alternate steps and apparatus encompassed by the invention. Tallow oil stream 4 and tallow-immiscible ionic liquid stream 2 are introduced to and contacted and separated in metal removal zone 100 to produce tallow-immiscible ionic liquid effluent stream 8 and tallow effluent stream 6 as described above. The ionic liquid stream 4 may be comprised of fresh ionic liquid stream 3 and/or one or more ionic liquid streams which are recycled in the process as described below. In an embodiment, a portion or all of tallow effluent stream 6 is passed via conduit 10 to a hydrocarbon conversion zone 800. Hydrocarbon conversion zone 800 may, for example, comprise at least one of an FCC and a hydrocracking process which are well known in the art.

An optional tallow oil washing step may be used, for example, to recover ionic liquid that is entrained or otherwise remains in the tallow oil effluent stream by using water to wash or extract the ionic liquid from the tallow oil effluent. In this embodiment, a portion or all of tallow oil effluent stream 6 (as feed) and a water stream 12 (as solvent) are introduced to tallow oil washing zone 400. The tallow oil effluent and water streams introduced to tallow oil washing zone 400 are mixed and separated to produce a washed tallow stream 14 and a spent water stream 16, which comprises the ionic liquid. The tallow oil washing step may be conducted in a similar manner and with similar equipment as used to conduct other liquid-liquid wash and extraction operations as discussed above. Various tallow oil washing step equipment and conditions such as temperature, pressure, times, and solvent to feed ratio may be the same as or different from the metal removal zone equipment and conditions. In general, the tallow oil washing step conditions will fall within the same ranges as given above for the metal removal step conditions. A portion or all of the washed tallow oil stream 14 may be passed to conversion zone 800.

An optional ionic liquid regeneration step may be used, for example, to regenerate the ionic liquid by removing the metal from the ionic liquid, i.e. reducing the metal content of the rich ionic liquid. In an embodiment, a portion or all of tallow-immiscible ionic liquid effluent stream 8 (as feed) comprising the metal and a regeneration solvent stream 18 are introduced to ionic liquid regeneration zone 500. The tallow-immiscible ionic liquid effluent and regeneration solvent streams are mixed and separated to produce an extract stream 20 comprising the metal, and a regenerated ionic liquid stream 22. The ionic liquid regeneration step may be conducted in a similar manner and with similar equipment as used to conduct other liquid-liquid wash and extraction operations as discussed above. Various ionic liquid regeneration step conditions such as temperature, pressure, times, and solvent to feed may be the same as or different from the metal removal conditions. In general, the ionic liquid regeneration step conditions will fall within the same ranges as given above for the metal removal step conditions.

In an embodiment, the regeneration solvent stream 18 comprises water wherein there is sufficient water provided to provide a metal extract and an ionic liquid/water phase that can be heated to reduce the water content to the level necessary for use in the invention. For example, a constraint on the water content of the tallow-immiscible ionic liquid stream 4 or the ionic liquid/tallow oil mixture in metal removal zone 100 may be met by controlling the proportion and water content of fresh and recycled ionic liquid streams.

Optional ionic liquid drying step is illustrated by drying zone 600. The ionic liquid drying step may be employed to reduce the water content of one or more of the streams comprising ionic liquid to control the water content of the metal removal step as described above. In the embodiment of FIG. 1, a portion or all of regenerated tallow-immiscible ionic liquid stream 22 is introduced to drying zone 600. Although not shown, other streams comprising ionic liquid such as the fresh ionic liquid stream 3, tallow-immiscible ionic liquid effluent stream 8, and spent water stream 16, may also be dried in any combination in drying zone 600. To dry the ionic liquid stream or streams, water may be removed by one or more various well known methods including distillation, flash distillation, and using a dry inert gas to strip water.

Generally, the drying temperature may range from about 100° C. to less than the decomposition temperature of the ionic liquid, usually less than about 300° C. The pressure may range from about 5 to about 690 kPa(g). The drying step produces a dried tallow-immiscible ionic liquid stream 24 and a drying zone water effluent stream 26. Although not illustrated, a portion or all of dried tallow-immiscible ionic liquid stream 24 may be recycled or passed to provide all or a portion of the tallow-immiscible ionic liquid introduced to metal removal zone 100. A portion or all of drying zone water effluent stream 26 may be recycled or passed to provide all or a portion of the water introduced into tallow washing zone 400 and/or ionic liquid regeneration zone 500.

Figure 2A:
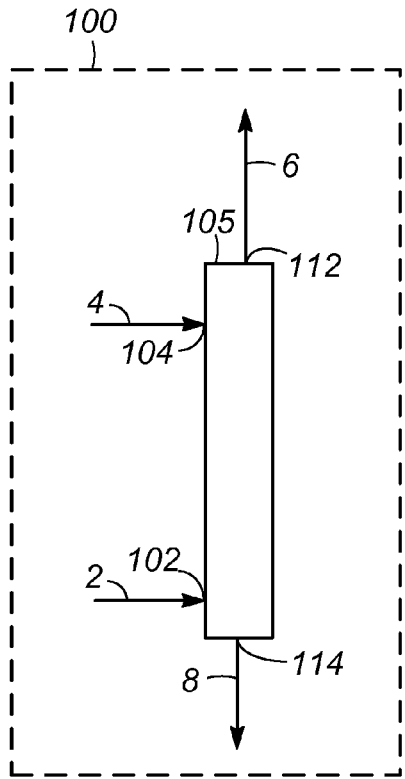
FIGS. 2A and 2B are simplified flow schemes illustrating different embodiments of an extraction zone of the invention.

FIG. 2A illustrates an embodiment of the invention which may be practiced in metal removal or extraction zone 100 that comprises a multi-stage, counter-current extraction column 105 wherein tallow oil and tallow-immiscible ionic liquid are contacted and separated. The tallow oil feed stream 2 enters extraction column 105 through tallow oil feed inlet 102 and lean ionic liquid stream 4 enters extraction column 105 through ionic liquid inlet 104. In the Figures, reference numerals of the streams and the lines or conduits in which they flow are the same. Tallow oil feed inlet 102 is shown located below ionic liquid inlet 104 but depending upon the relative densities of the ionic liquid and the tallow oil feed, in some embodiments, the tallow feed inlet may be above the ionic liquid inlet. The tallow oil effluent passes through tallow oil effluent outlet 112 in an upper portion of extraction column 105 to tallow oil effluent conduit 6. The tallow-immiscible ionic liquid effluent including the metal removed from the tallow oil feed passes through ionic liquid effluent outlet 114 in a lower portion of extraction column 105 to ionic liquid effluent conduit 8.

Consistent with common terms of art, the ionic liquid introduced to the metal removal step may be referred to as a "lean ionic liquid" generally meaning a tallow-immiscible ionic liquid that is not saturated with one or more extracted metals. Lean ionic liquid may include one or both of fresh and regenerated ionic liquid and is suitable for accepting or extracting metal from the tallow oil feed. Likewise, the ionic liquid effluent may be referred to as "rich ionic liquid", which generally means a tallow-immiscible ionic liquid effluent produced by a metal removal step or process or otherwise including a greater amount of extracted metals than the amount of extracted metals included in the lean ionic liquid. A rich ionic liquid may require regeneration or dilution, e.g. with fresh ionic liquid, before recycling the rich ionic liquid to the same or another metal removal step of the process.

Figure 2B:
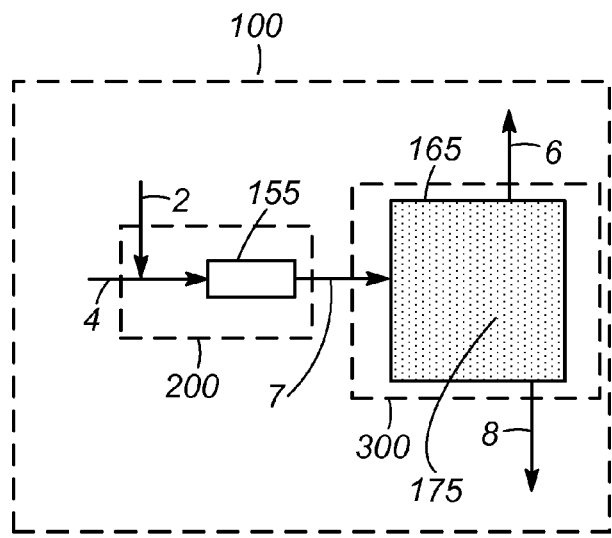

FIG. 2B illustrates another embodiment of metal removal washing zone 100 that comprises a contacting zone 200 and a separation zone 300. In this embodiment, lean ionic liquid stream 4 and tallow oil feed stream 2 are introduced into the contacting zone 200 and mixed by introducing tallow oil feed stream 2 into the flowing lean ionic liquid stream 4 and passing the combined streams through static in-line mixer 155. Static in-line mixers are well known in the art and may include a conduit with fixed internals such as baffles, fins, and channels that mix the fluid as it flows through the conduit. In other embodiments, not illustrated, lean ionic liquid stream 4 may be introduced into tallow oil feed stream 2, or the lean ionic liquid stream 4 and tallow oil feed stream may be combined such as through a "Y" conduit. In another embodiment, lean ionic liquid stream 4 and tallow oil feed stream 2 are separately introduced into the static in-line mixer 155. In other embodiments, the streams may be mixed by any method well know in the art including stirred tank and blending operations. The mixture comprising tallow oil and ionic liquid is transferred to separation zone 300 via transfer conduit 7. Separation zone 300 comprises separation vessel 165 wherein the two phases are allowed to separate into a rich ionic liquid phase which is withdrawn from a lower portion of separation vessel 165 via ionic liquid effluent conduit 8 and the tallow oil phase is withdrawn from an upper portion of separation vessel 165 via tallow oil effluent conduit 6. In another embodiment of the invention, the rich ionic liquid phase may be withdrawn from an upper portion of the separation vessel and the tallow oil phase removed from the lower portion of the separation vessel when the tallow oil phase is of a higher density than the rich ionic liquid phase. Separation vessel 165 may comprise a boot, not illustrated, from which rich ionic liquid is withdrawn via conduit 8.

Separation vessel 165 may contain a solid media 175 and/or other coalescing devices which facilitate the phase separation. In other embodiments the separation zone 300 may comprise multiple vessels which may be arranged in series, parallel, or a combination thereof. The separation vessels may be of any shape and configuration to facilitate the separation, collection, and removal of the two phases. In a further embodiment, metal removal zone 100 may include a single vessel wherein lean ionic liquid stream 4 and tallow oil feed stream 2 are mixed, remain in the vessel to settle into the tallow oil effluent and rich ionic liquid phases. In an embodiment the process comprises at least two metal removal steps. For example, the tallow oil effluent from one metal removal step may be passed directly as the tallow oil feed to a second metal removal step. In another embodiment, the tallow oil effluent from one metal removal step may be treated or processed before being introduced as the tallow oil feed to the second metal removal step. There is no requirement that each metal removal zone comprises the same type of equipment. Different equipment and conditions may be used in different metal removal zones.

The metal removal step may be conducted under metal removal conditions including temperatures and pressures sufficient to keep the tallow oil-immiscible ionic liquid and tallow oil feeds and effluents as liquids. For example, the metal removal step temperature may range between about 10° C. and less than the decomposition temperature of the ionic liquid and the pressure may range between about atmospheric pressure and about 700 kPa(g). When the tallow-immiscible ionic liquid comprises more than one ionic liquid component, the decomposition temperature of the ionic liquid is the lowest temperature at which any of the ionic liquid components decompose. The metal removal step may be conducted at a uniform temperature and pressure or the contacting and separating steps of the metal removal step may be operated at different temperatures and/or pressures. In a non limiting example, the temperature is at least about 80° C.

The above and other metal removal step conditions such as the contacting or mixing time, the separation or settling time, and the ratio of tallow-immiscible ionic liquid (lean ionic liquid) to tallow oil feed may vary greatly based, for example, on the specific ionic liquid or liquids employed, the nature of the tallow oil feed (straight run or previously processed), the metal content of the tallow oil feed, the degree of metal removal required, the number of metal removal steps employed, and the specific equipment used. In general it is expected that contacting time may range from less than one minute to about two hours; settling time may range from about one minute to about eight hours; and the weight ratio of tallow oil feed to lean ionic liquid introduced to the metal removal step may range from 1:10,000 to 10,000:1. In an embodiment, the weight ratio of tallow oil feed to lean ionic liquid may range from about 1:1,000 to about 1,000:1; and the weight ratio of tallow oil feed to lean ionic liquid may range from about 1:100 to about 100:1. In an embodiment the weight of tallow oil feed is greater than the weight of ionic liquid introduced to the metal removal step. The degree of phase separation between the tallow oil and ionic liquid phases is another factor to consider as it affects recovery of the ionic liquid and tallow oil. The degree of metal removed and the recovery of the tallow oil and ionic liquids may be affected differently by the nature of the tallow oil feed, the specific ionic liquid or liquids, the equipment, and the metal removal conditions such as those discussed above.

The amount of water present in the tallow oil/tallow-immiscible ionic liquid mixture during the metal removal step may also affect the amount of metal removed and/or the degree of phase separation or recovery of the tallow oil and ionic liquid. In an embodiment of the invention, the tallow oil/tallow-immiscible ionic liquid mixture has a water content of less than about 2% relative to the weight of the ionic liquid. In another embodiment, the water content of the tallow oil/tallow-immiscible ionic liquid mixture is less than about 50% relative to the weight of the ionic liquid; and the water content of the tallow oil/tallow-immiscible ionic liquid mixture may be less than about 2% relative to the weight of the ionic liquid. In a further embodiment, the tallow oil/tallow-immiscible ionic liquid mixture is water free, i.e. the mixture does not contain water. In yet another embodiment of the invention, the water content of the tallow oil/tallow-immiscible liquid mixture may be up to 90% relative to the weight of the ionic liquid.

Unless otherwise stated, the exact connection point of various inlet and effluent streams within the zones is not essential to the invention. For example, it is well known in the art that a stream to a distillation zone may be sent directly to the column, or the stream may first be sent to other equipment within the zone such as heat exchangers, to adjust temperature, and/or pumps to adjust the pressure. Likewise, streams entering and leaving metal removal, washing, and regeneration zones may pass through ancillary equipment such as heat exchanges within the zones. Streams, including recycle streams, introduced to washing or extraction zones may be introduced individually or combined prior to or within such zones.

The invention encompasses a variety of flow scheme embodiments including optional destinations of streams, splitting streams to send the same composition, i.e. aliquot portions, to more than one destination, and recycling various streams within the process. Examples include: various streams comprising ionic liquid and water may be dried and/or passed to other zones to provide all or a portion of the water and/or ionic liquid required by the destination zone. The various process steps may be operated continuously and/or intermittently as needed for a given embodiment e.g. based on the quantities and properties of the streams to be processed in such steps. As discussed above the invention encompasses multiple metal removal steps, which may be performed in parallel, sequentially, or a combination thereof. Multiple metal removal steps may be performed within the same metal removal zone and/or multiple metal removal zones may be employed with or without intervening washing, regeneration and/or drying zones.

EXAMPLES

The examples are presented to further illustrate some aspects and benefits of the invention and are not to be considered as limiting the scope of the invention.

Example 1

In an experiment 10 grams of 3A Darling animal fat, or tallow, was combined with 5 grams of Cyphos 106 (triisobutylmethylphosphonium tosylate) ionic liquid and 5 grams of water in a glass vial. The vial was heated to 80° C. and stirred with a magnetic stir bar for 30 minutes at approximately 350 rpm. The sample was allowed to settle for 30 minutes at 80° C. It was noted that complete separation between the ionic liquid and the tallow occurred. The extracted tallow was analyzed for metals by ICP, >90% of the iron was removed.

Example 2

In an experiment, 10 grams of 3A Darling animal fat, or tallow, was combined with 5 grams of Cyphos 108 tributylmethylphosphonium methylsulfate ionic liquid and 5 grams of water in a glass vial. The vial was heated to 80° C. and stirred with a magnetic stir bar for 30 minutes at approximately 350 rpm. The sample was allowed to settle for 30 minutes at 80° C. It was noted that complete separation between the ionic liquid and the tallow occurred. The extracted tallow was analyzed for metals by ICP, >80% of the iron was removed.

Example 3

In an experiment, 10 grams of 3A Darling animal fat, or tallow, was combined with 5 grams of Cyphos 169 ethyltributylphosphonium diethylphosphate liquid and 5 grams of water in a glass vial. The vial was heated to 80° C. and stirred with a magnetic stir bar for 30 minutes at approximately 350 rpm. The sample was allowed to settle for 30 minutes at 80° C. It was noted that complete separation between the ionic liquid and the tallow occurred. The extracted tallow was analyzed for metals by ICP, >90% of the iron was removed.

Comparative Example 4

In one experiment 10 grams of 3A Darling animal fat from Darling International Inc., Irving, Tex., or tallow, was combined with 5 grams of Cyphos 106 (triisobutylmethylphosphonium tosylate) ionic liquid in a glass vial. The vial was heated to 80° C. and stirred with a magnetic stir bar for 30 minutes at approximately 350 rpm. The sample was allowed to settle for 30 minutes at 80° C. It was noted that only partial separation between the tallow and the ionic liquid occurred.

Comparative Example 5

In one experiment 10 grams of 3A Darling animal fat from Darling International Inc., Irving, Tex., or tallow, was combined with 5 grams of Cyphos 108 tributylmethylphosphonium methylsulfate ionic liquid in a glass vial. The vial was heated to 80° C. and stirred with a magnetic stir bar for 30 minutes at approximately 350 rpm. The sample was allowed to settle for 30 minutes at 80° C. It was noted that only partial separation between the tallow and the ionic liquid occurred.

Comparative Example 6

In one experiment 10 grams of 3A Darling animal fat from Darling International Inc., Irving, Tex., or tallow, was combined with 5 grams of Cyphos 169 ethyltributylphosphonium diethylphosphate ionic liquid in a glass vial. The vial was heated to 80° C. and stirred with a magnetic stir bar for 30 minutes at approximately 350 rpm. The sample was allowed to settle for 30 minutes at 80° C. It was noted that only partial separation between the tallow and the ionic liquid occurred.

Similar experiments using the following ionic liquids showed no separation:
Cyphos 101 tetradecyltrihexylphosphonium chloride
Cyphos 102 tetradecyltrihexylphosphonium bromide
Cyphos 104 trihexyl(tetradecyl)phosphonium bis 2,4,4-trimethylpentylphosphinate.

The invention claimed is:

1. A process for removing iron from a tallow oil comprising:
   a) contacting the tallow oil comprising iron with a tallow-immiscible ionic liquid to produce a mixture comprising the tallow oil and the tallow-immiscible ionic liquid, the tallow-immiscible ionic liquid comprising at least one of a imidazolium ionic liquid, a phosphonium ionic liquid, and a pyridinium ionic liquid diluted with from 0 to 95% water; and
   b) separating the mixture to produce a tallow oil effluent and a tallow-immiscible ionic liquid effluent, the tallow-immiscible ionic liquid effluent comprising the metal.

2. The process of claim 1 wherein the tallow-immiscible ionic liquid comprises at least one of 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, tetrabutylphosphonium methane sulfonate, pyridinium p-toluene sulfonate, tetrabutylphosphonium chloride, tetrabutylphosphonium bromide, tributyl(octyl)phosphonium chloride, triisobutyl(methyl)phosphonium tosylate and tributyl(ethyl)phosphonium diethylphosphate.

3. The process of claim 1 wherein the tallow-immiscible ionic liquid is diluted with from about 0 to 5-% water.

4. The process of claim 1 wherein the mixture further comprises water in an amount less than 10% relative to the amount of tallow-immiscible ionic liquid in the mixture on a weight basis.

5. The process of claim 1 wherein the ratio of the tallow oil to the tallow oil-immiscible ionic liquid in the mixture ranges from about 1:1000 to about 1000:1 on a weight basis.

6. The process of claim 1 wherein at least 50% of said iron is removed from said tallow oil.

7. The process of claim 1 wherein at least 90% of said iron is removed from said tallow oil.

8. The process of claim 1 further comprising passing at least a portion of the tallow oil effluent to a hydrocarbon conversion process.

9. The process of claim 1 further comprising washing at least a portion of the tallow oil effluent with water to produce a washed tallow oil stream and a spent water stream.

10. The process of claim 9 further comprising passing at least a portion of the washed tallow oil stream to a conversion process.

11. The process of claim 1 further comprising contacting the tallow-immiscible ionic liquid effluent with a regeneration solvent and separating the tallow-immiscible ionic liquid effluent from the regeneration solvent to produce an extract stream comprising the metal and a regenerated tallow-immiscible ionic liquid stream.

12. The process of claim 11 further comprising recycling at least a portion of the regenerated tallow-immiscible ionic liquid stream to the metal removal contacting step of claim 1(a).

13. The process of claim 11 wherein the regeneration solvent comprises a lighter fraction relative to the oil and the extract stream further comprises the lighter fraction, the lighter fraction being immiscible with the tallow-immiscible ionic liquid.

14. The process of claim 11 wherein the regeneration solvent comprises water and the regenerated tallow-immiscible ionic liquid stream comprises water.

15. The process of claim 14 wherein the tallow oil effluent comprises tallow-immiscible ionic liquid, the process further comprising washing at least a portion of the tallow oil effluent with water to produce a washed tallow oil stream and a spent water stream, the spent water stream comprising the tallow-immiscible ionic liquid; wherein at least a portion of the spent water stream is at least a portion of the regeneration solvent.

16. The process of claim 15 further comprising drying at least a portion of at least one of the regenerated tallow-immiscible ionic liquid stream and the spent water stream to produce a dried tallow-immiscible ionic liquid stream.

17. The process of claim 16 further comprising recycling at least a portion of the dried tallow-immiscible ionic liquid stream to the metal removal contacting step of claim 1(a).

* * * * *